United States Patent
Klahn

(10) Patent No.: US 10,767,652 B2
(45) Date of Patent: Sep. 8, 2020

(54) PERMANENT MAGNET SUBMERSIBLE MOTOR WITH A ONE-PIECE ROTOR/YOKE CONFIGURATION AND RESIN EMBEDDED MAGNETS

(71) Applicant: Flowserve Management Company, Irving, TX (US)

(72) Inventor: Michael Klahn, Boernsen (DE)

(73) Assignee: Flowserve Management Company, Irving, TX (US)

( * ) Notice: Subject to any disclaimer, the term of this patent is extended or adjusted under 35 U.S.C. 154(b) by 224 days.

(21) Appl. No.: 16/060,749

(22) PCT Filed: Dec. 14, 2016

(86) PCT No.: PCT/US2016/066622
§ 371 (c)(1),
(2) Date: Jun. 8, 2018

(87) PCT Pub. No.: WO2017/106318
PCT Pub. Date: Jun. 22, 2017

(65) Prior Publication Data
US 2018/0363660 A1     Dec. 20, 2018

Related U.S. Application Data

(60) Provisional application No. 62/266,919, filed on Dec. 14, 2015.

(51) Int. Cl.
*F04D 13/10* (2006.01)
*F04B 17/03* (2006.01)
(Continued)

(52) U.S. Cl.
CPC ............. *F04D 13/10* (2013.01); *F04B 17/03* (2013.01); *F04B 47/06* (2013.01); *H02K 1/278* (2013.01);
(Continued)

(58) Field of Classification Search
CPC .......... F04D 13/10; F04B 17/03; F04B 47/06; H02K 1/278; H02K 1/28; H02K 2005/1287
See application file for complete search history.

(56) References Cited

U.S. PATENT DOCUMENTS 5,488,260 A   1/1996  Heyraud
5,801,470 A   9/1998  Johnson et al.
(Continued)

FOREIGN PATENT DOCUMENTS

WO     2005053136 A1     6/2005

OTHER PUBLICATIONS

International Search Report and Written Opinion, completed Feb. 2, 2017, pertaining to PCT/US2016/066622 filed Dec. 14, 2016.
(Continued)

*Primary Examiner* — Jue Zhang
(74) *Attorney, Agent, or Firm* — Dinsmore & Shohl, LLP

(57) ABSTRACT

A permanent magnet submersible motor for electric submersible pump systems and a method of making the rotor of such a motor. The unitary construction of the rotor shaft and the yoke provides improved protection of the damage-prone magnets, while the larger effective shaft diameter also improves shaft bending resistance. Shaped form closures on the yoke promote secure magnet retention, even under highly centrifugal loads, while an exterior cladding tube and a cast resin filler material are used to further secure the magnets around the yoke periphery while also providing hermetic sealing against a working fluid.

19 Claims, 2 Drawing Sheets

(51) Int. Cl.
*H02K 1/28* (2006.01)
*F04B 47/06* (2006.01)
*H02K 1/27* (2006.01)
*H02K 5/128* (2006.01)

(52) U.S. Cl.
CPC ....... *H02K 1/28* (2013.01); *H02K 2005/1287* (2013.01)

(56) References Cited

U.S. PATENT DOCUMENTS

| | | | |
|---|---|---|---|
| 6,737,782 B2 | 5/2004 | Suzuki et al. | |
| 7,971,650 B2* | 7/2011 | Yuratich | E21B 43/128 |
| | | | 166/372 |
| 8,525,380 B2* | 9/2013 | Chang | H02K 49/106 |
| | | | 310/156.08 |
| 8,602,753 B2* | 12/2013 | Schlenhoff | F04D 29/047 |
| | | | 417/423.13 |
| 2014/0028119 A1 | 1/2014 | Sagalovskiiy et al. | |
| 2014/0227118 A1* | 8/2014 | Kim | F04D 13/064 |
| | | | 417/420 |

OTHER PUBLICATIONS

Extended European Search Report pertaining to corresponding European Patent Application No. 16876566.7, dated Oct. 1, 2019.

* cited by examiner

PERMANENT MAGNET SUBMERSIBLE MOTOR WITH A ONE-PIECE ROTOR/YOKE CONFIGURATION AND RESIN EMBEDDED MAGNETS

CROSS-REFERENCE TO RELATED APPLICATIONS

This patent application claims priority to U.S. Provisional Application Ser. No. 62/266,919, filed Dec. 14, 2015, and entitled "Permanent Magnet Submersible Motor With A One-Piece Rotor/Yoke Configuration And Resin Embedded Magnets," which is hereby incorporated by reference in its entirety.

TECHNICAL FIELD

The present disclosure relates generally to synchronous motors for use in submersible pump systems that use rotor-mounted permanent magnets, and more particularly to a rotor configuration that provides improved magnet protection and shaft deflection resistance against submersible pump environmental conditions.

BACKGROUND

Electric submersible pumps (ESP) (also referred to as deep well submersible (DWS) pumps) are especially useful in extracting valuable resources from deep well geological formations. In one example, an ESP can be used to retrieve crude oil or natural gas from significant subterranean depths. In another widely-used example, an ESP provides the motive power to large quantities of water, such as those used in municipal waterworks. ESPs conventionally include a centrifugal pump section and a motor section that are axially aligned with one another and oriented vertically in the well. More particularly, the motor section may be configured to drive one or more pump section stages.

Because ESPs are relatively inaccessible (often completely submerged at distances between about 10 and 700 meters beneath the earth's surface), they must be able to run for extended periods without requiring maintenance. Such extended operating times means that the economic feasibility of a system utilizing such pumps requires dependable, robust componentry. This can frequently be at odds with the need to design more efficient pumping systems as a way to alleviate increasing energy costs and more stringent environmental policies.

One particular motor configuration that has shown promise for high-efficiency operation is based on the use of a permanent magnet rotor, and is known as a permanent magnet synchronous motor (PMSM). Unfortunately, these are more expensive to build than conventional (asynchronous) induction motors, thereby offsetting the gains made possible by the inherent efficiency improvements. More significantly, the peculiar environment associated with submersible motors can hamper the long-term robustness that is needed in order to justify the higher cost of the PMSM; such environmental concerns include (a) requiring the use of a long, thin rotor to fit in limited diameter boreholes or pipes as a way to maximize the power output at a given outer motor diameter, (b) preventing the corrosive effects on the magnets of the motor lubricant or working fluid, and (c) the lengthy meantime between service of ESPs. More particularly, the first concern takes into consideration that the motors (and their respective shafts) used in an ESP define a long, thin profile where the magnetic and rotordynamic forces would tend to cause shaft deflection. Such deflection can undesirably lead to rotor contact with the stator. Likewise, the second concern is not ameliorated by the use of coatings on the magnets, as the prolonged exposure of the magnets to fluids (which are often at elevated temperature) will invariably lead to material degradation. Regarding this third concern, such exposure (and related magnet and motor damage) is inconsistent with the desired long times between service that are needed to make submersible pumps economically viable.

What is needed is a high-efficiency PMSM design for use in a submersible pump system that provides improved protection of the motor's rotor-mounted permanent magnets, as well as enhanced durability for the rotor.

SUMMARY

A rotor for an electric submersible pump, the rotor having a shaft rigidly coupled to one or more pump impellers, where the shaft can rotate the pump impellers. The shaft has a concentric yoke integrally-formed with the shaft, and the yoke is defined with a fore end and an aft end. The rotor also has one or more permanent magnets positioned about the circumference of the yoke, where the magnets axially align with the yoke. A cladding tube is positioned around the circumference of the magnets to secure the magnets to the shaft through the yoke. A stepped collar is located on the fore end and the aft end of the yoke, and the magnets are sealed between the yoke and the cladding tube by the stepped collar.

A method of constructing a rotor for an electric submersible pump. The method requires the assembly of a yoke, a stepped collar, and a cladding tube of the rotor to form a magnet channel able to have magnets positioned in the channel. The method further requires coupling a shaft to rotate the pump impellers, the shaft having a concentric yoke integrally-formed to the shaft, and disposing the magnets on the circumference of the yoke, having the magnets axially align with the yoke, and positioning a stepped collar on the fore end and the aft end of the yoke. The method is completed with the placement of a cladding tube on the circumference of the magnets, the cladding tube securing the magnets to the shaft.

An electric submersible pump having a motor section, a pump section, a fluid inlet section located axially between the motor section and the pump section, and a fluid outlet section located at the top of the pump section. The motor section has a synchronous motor, an outer casing enclosing the motor assembly, and a thermal transfer solution in the outer casing and in contact with motor components. The motor also has a rotor and a stator, the rotor comprising a shaft the length of the motor section in coupled to the pump impellers, the shaft having a concentric yoke integral with the shaft. The motor further has magnets located on the circumference of the yoke, the magnets axially coinciding with the yoke. A cladding tube is positioned around the circumference of the magnets to secure the magnets to the shaft through the yoke. A stepped collar is located on the fore end and the aft end of the yoke, and the magnets are sealed between the yoke and the cladding tube by the stepped collar. The pump section is located above the motor section and has at least one pump bowl. Each pump bowl has centrifugal impellers which are rotated by the turning shaft. The centrifugal impellers receive an extracted fluid through the fluid inlet and then push the extracted fluid through the fluid outlet.

BRIEF DESCRIPTION OF THE DRAWINGS

The following detailed description of the preferred embodiments of the present disclosure can be best understood when read in conjunction with the following drawings, where like structure is indicated with like reference numerals and in which the various components of the drawings are not necessarily illustrated to scale.

Figure 1:
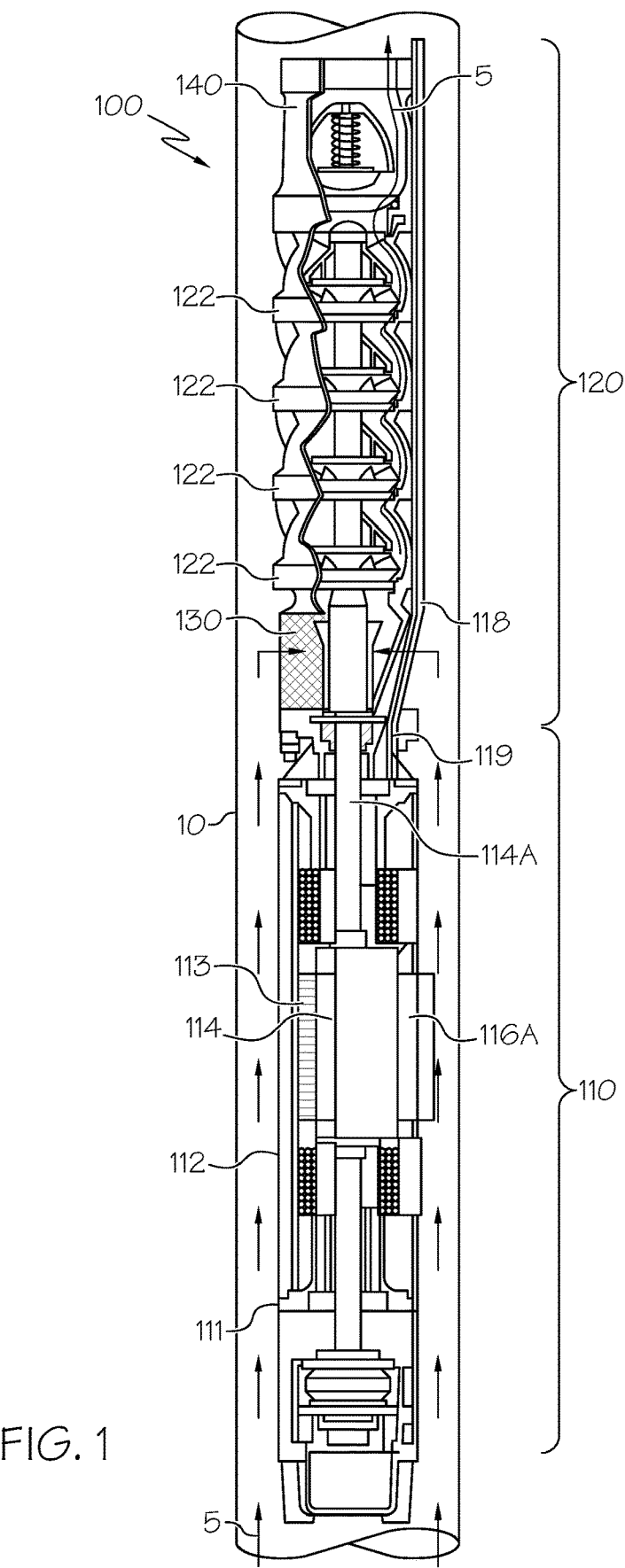
FIG. 1 shows an ESP comprising a PMSM as shown and described herein.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

Referring first to FIG. 1, the ESP 100 is placed within well piping 10 and includes a motor section 110, a pump section 120, a fluid inlet section 130 to accept a flow of incoming extracted fluid 5, and a fluid outlet section 140 that can be used to discharge the fluid 5 to a riser, pipestack or related fluid-conveying tubing. The motor section 110 and the pump section 120 are substantially vertically aligned in order to fit inside of the well piping 10. Conserving axial space is a primary concern in the use of ESPs 100. As shown, both the motor section 110 and the pump section 120 may be made of modular subsections. Thus, within pump section 120, there may be numerous serially-arranged subsections in the form of pump bowls 122 that each house respective centrifugal impellers. Within the motor section 110, there may be one or more motor assemblies or separate subsections for various components within the motor section 110. The fluid inlet section 130 is situated axially between the motor and pump sections 110, 120, and may include a mesh or related screen to keep large-scale particulate out in order to avoid or minimize particulate contact with the rotating components in the pump section 120. Because the operating temperature of the motor section 110 is higher than that of the extracted fluid 5, any heat exchange between the fluid 5 and the outer surfaces of motor section 110 tends to cool the motor section 110 and the various components within it.

Motor section 110 has a casing, outer wall, or related enclosure 112 that is preferably filled with a thermal transfer fluid 113 that in addition to providing lubrication to the motor bearings, possesses a high thermal coupling of the heat sources to the enclosure 112. In certain embodiments, the thermal transfer fluid 113 may be water or an antifreeze (such as glycol with water). Thus, heat generated within the motor section 110 is efficiently carried by this internal filling to the enclosure 112, where it can be exchanged with the fluid 5 being pumped that passes in the circumferential channel 111 that is formed between the outside of the enclosure 112 and the inside of well piping 10.

Within the casing 112, the motor section 110 defines a synchronous motor that includes a rotor 114 and a stator 116 that operate by electromagnetic principles well-known to those skilled in the art. The rotor 114 and stator 116 are magnetically coupled so that the rotor 114 is made to spin along its vertical axis when acted upon by the stator 116, thereby operating the pump section 120 of the ESP 100. As will be additionally understood by those skilled in the induction motor art, stator 116 may further include coil winding (not shown). Electric current is provided to stator 116 by a power cable 118 that typically extends along the outer surface defined by casing 112. Power cable 118 is in turn electrically coupled to a source that may include computer-controlled variable-frequency drives. It is further contemplated that the motor section 110 may comprise more than one synchronous motor, where each motor may comprise a rotor 114 and a stator 116 to operate the pump section.

Figure 2A:
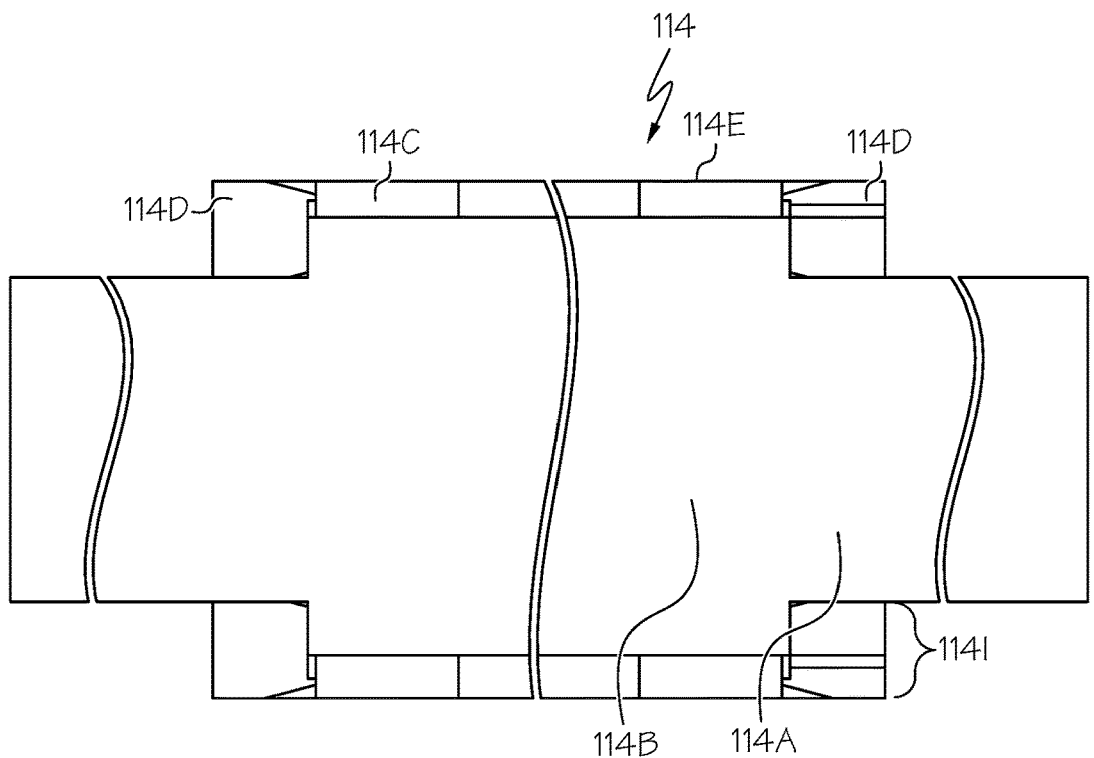
FIG. 2A shows a side view of a rotor that may be used in the pump of FIG. 1.
Figure 2B:
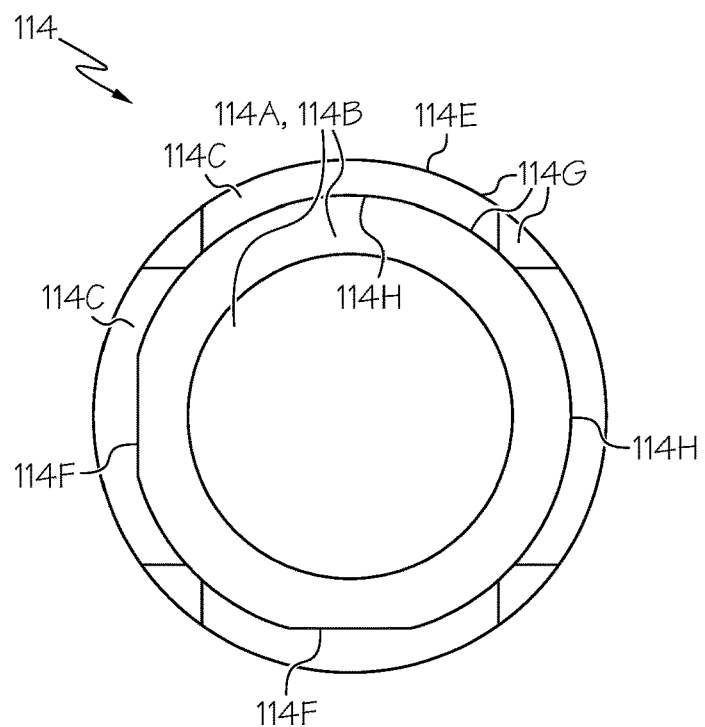
FIG. 2B shows an end view of the rotor of FIG. 2A.

Referring next to FIGS. 2A and 2B, the rotor 114 includes a shaft 114A that extends over the length of the motor section 110 (and optionally over the entire length of the ESP 100 through suitable coupling (not shown)). In one form, the shaft 114A extends out of the upper end of the motor section casing 112 into the pump section 120, and is fluidly isolated between the motor and pump sections 110 and 120 by seals 119 that are disposed between them. The seals 119 prevent the extracted fluid 5 from entering the motor section 110 of the ESP 100, which may cause corrosion of the motor components. The seals 119 in turn prevent the thermal transfer fluid 113 from exiting the motor section. Operation of motor section 110 causes the shaft 114A to turn, which in turn causes the serially-arranged centrifugal impellers 122 in the pump section 120 to rotate so that fluid 5 can be pressurized and conveyed through tubing and exit through the fluid outlet section 140.

Details associated with providing magnet protection against the ambient deep well environment discussed above include having a concentric yoke 114B that axially coincides with the placement of a series of permanent magnets 114C; importantly, rather than having the yoke 114B be formed of numerous laminated iron plates, it is integrally-formed with the shaft 114A, which by virtue of its larger integrally-formed radius and larger polar and area moment of inertia increases the effective bending stiffness of rotor 114 by defining a larger radial profile. As shown in FIGS. 2A and 2B, the yoke 114B is comprised of only one piece, without the addition of separate sections or parts. A stepped collar 114D, in one form a balancing ring, is placed fore and aft of the yoke 114B in order to provide axial load support and further increases in bending resistance, as well as sealing closure, of the magnets 114C. Regarding the increase in bending resistance due to the the stepped collar 114D, inadvertent grinding or related machining or wear on the magnets 114C is avoided. Importantly, the stepped collar 114D has an inherently low part count and ease of assembly.

In one form, the magnets 114C are surface mounted to the yoke 114B. In order to secure the magnets 114C to the yoke 114B, the magnets 114C may be glued thereon. By placing magnets 114C on the surface of the rotor yoke 114B, the pole-pitch factor can be maximized, which in turn promotes high energy densities. Such a construction is optimal for long thin rotors such as those used in submersible motors such as ESP 100. As such, the magnets 114C are fixed to the shaft 114A through the yoke 114B using a cladding tube 114E in addition to an optional castable resin 114G to fill all gaps between tube 114E, magnets 114C and rotor yoke 114B. Through this fixation, very high centrifugal forces can be withstood; moreover, the magnets 114C may be hermetically sealed against the ambient environment. Thus, through the isolation against the motor filling liquid (not shown), the likelihood of corrosion to the magnets 114C is reduced or eliminated. The tube 114E may fully encompass the circumference of the magnets 114C joined to the yoke 114B, and therefore surround the circumference of the yoke 114B itself. The cladding tube 114E in one or more embodiments may be a strong, prefabricated cladding tube 114E, allowing for ease of assembly and improving the rigid structure and durability of the rotor 114, being fully produced and finished before being assembled to the yoke 114B. In addition, the cladding tube 114E can provide a highly accurate surface with close dimensional tolerances, which is valuable in reducing friction losses in configurations where rotor 114 and stator 116 are closely-coupled. Furthermore, by using a non-conductive material, eddy current losses in the tube 114E can be avoided. In one form the cladding tube 114E is made from a wound carbon fiber impregnated with epoxy resin, while in another it is made of fiberglass.

From the manufacturing point of view, the described construction of rotor 114 provides the robustness typically associated with traditional buried magnets while also being much simpler to assemble than that of known surface mounted magnet approaches. As such, the present use of the yoke 114B, stepped collar 114D (which in one configuration may operate as the aforementioned balancing ring) and the cladding tube 114E define a magnet channel 114I sized to accept the comparably sized and shaped magnets 114C that can be easily inserted therein. Significantly, ancillary manufacturing operations, such as drilling, milling or stacking of punched metal sheets to produce such a channel, are not necessary, thereby simplifying the rotor 114 assembly process.

As mentioned above, in one preferred form, the castable resin 114G may be in the form of a filler material placed between radially-adjacent magnets 114C to not only fill gaps that otherwise would permit unacceptably high levels of magnet 114C shifting, but also inhibit direct contact between the magnets 114C and the ambient environment that may include (among others) lubricant, coolant or working fluid. In a preferred assembly step, the castable resin 114G is injected into the channel of the cladding tube 114E before the magnets 114C are moved in; this helps reduce the likelihood of air bubble formation without having to use a vacuum process. As such, the tube 114E, along with resin 114G helps protect the magnets 114C from lubricants, working fluid and their associated thermal, chemical or frictional interaction.

Referring with particularity to FIG. 2B, two variants of the yoke 114B outer profile of are also contemplated, both of which are within the scope of the present disclosure. In one variant, numerous faceted spots are formed as chord-like spot facing around the yoke 114B periphery, while in another, the circumference defines a substantially constant axial profile 114H. Regarding the first, these faceted features define an outer dimension form closure 114F. Although not shown all around the yoke 114B circumference, were it to do so, form closure 114F would impart a polygonal shape to the outer periphery of yoke 114B. In particular, the faceted shape of the form closures 114F promote improved torque transferral to the magnets 114C during rotor 114 rotation. In one form, the magnets 114C may be shaped with planar lower surfaces such that they can be glued very securely to the shaft 114A. As discussed above, the balancing ring stepped collar 114D may also be used to help provide both axial confinement of the magnets 114C as well as additional shaft 114A stiffening and magnet 114C hermetic sealing.

While not necessary for operation of the pump 100, the magnets 114C in one preferred form may be made from high-capacity rare-earth materials (such as NdFeB), while in others they may also include Dy or Tb. While such materials tend to have superior electromagnetic performance, they also have a greater tendency to corrode than with more conventional materials. In the event that such rare earths are used, the hermetically-sealed construction made possible by one or both of the cladding tube 114E and resin 114G ensures ample environmental resistance of the magnets 114C without significantly more complex rotor 114 construction.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment. Likewise, for the purposes of describing and defining embodiments herein it is noted that the terms "substantially", "significantly", "about" and "approximately" that may be utilized herein represent the inherent degree of uncertainty that may be attributed to any quantitative comparison, value, measurement or other representation. Such terms are also utilized herein to represent the degree by which a quantitative representation may vary from a stated reference without resulting in a change in the basic function of the subject matter at issue.

Having described embodiments of the present disclosure in detail, and by reference to specific embodiments thereof, it will be apparent that modifications and variations are possible without departing from the scope of the embodiments defined in the appended claims. More specifically, although some aspects of embodiments of the present disclosure are identified herein as preferred or particularly advantageous, it is contemplated that the embodiments of the present disclosure are not necessarily limited to these preferred aspects.

The invention claimed is:

1. A rotor for use in an electric submersible pump, the rotor comprising:
   a shaft in rigid communication with and configured to rotate one or more pump impellers, said shaft comprising a concentric yoke integrally-formed therewith, the yoke comprising a fore end and an aft end;
   one or more permanent magnets disposed about the circumference of the yoke, the one or more permanent magnets positioned to axially coincide with the yoke and form an interface with the yoke to comprise an outer dimension form closure on the circumference of the yoke such that form closed torque transmission is present between the one or more permanent magnets and the yoke;
   a cladding tube disposed around the circumference of the permanent magnets to secure the one or more permanent magnets to the shaft through the yoke; and
   a stepped collar located on each of the fore end and the aft end of the yoke, wherein the one or more permanent magnets are sealed between the yoke and the cladding tube by the stepped collar.

2. The rotor of claim 1, wherein the wherein the stepped collar is a balancing ring.

3. The rotor of claim 1, wherein the one or more permanent magnets are hermetically sealed to the yoke by a castable resin and one or more gaps around the one or more permanent magnets are filled by the castable resin.

4. The rotor of claim 1, wherein the one or more permanent magnets are composed of high-capacity rare-earth materials, comprising at least one of Nd, Dy, and Tb.

5. The rotor of claim 1, wherein the yoke pole-pitch factor is maximized with the placement of the one or more permanent magnets on the surface of the yoke.

6. The rotor of claim 1, wherein the yoke interface with the one or more permanent magnets comprises a substantially constant axial profile.

7. The rotor of claim 1, wherein one or more of the permanent magnets comprise a planar lower surface which aligns with a portion of the form closure.

8. The rotor of claim 1, wherein the form closure is defined by a faceted spot for each respective permanent magnet around the circumference of the yoke.

9. A method of constructing a rotor for an electric submersible pump, the method comprising the assembly of a yoke, a stepped collar, and a cladding tube to define a magnet channel sized to accept one or more permanent magnets, the method further comprising:
  placing a shaft in rigid communication with and configuring to rotate one or more pump impellers, said shaft comprising a concentric yoke integrally-formed therewith, the yoke comprising a fore end and an aft end;
  disposing the one or more permanent magnets about the circumference of the yoke to form an interface with the yoke that comprises an outer dimension form closure on the circumference of the yoke in order to enhance torque transmission between the one or more permanent magnets and the yoke;
  further positioning the one or more permanent magnets to axially coincide with the yoke;
  positioning a stepped collar on each of the fore end and the aft end of the yoke; and
  disposing a cladding tube around the circumference of the one or more permanent magnets, the cladding tube securing the one or more permanent magnets to the shaft through the yoke.

10. The method of claim 9, the method further comprising injecting a castable resin into the magnet channel prior to the introduction of the one or more magnets to the magnet channel.

11. An electric submersible pump comprising a motor section, a pump section, a fluid inlet section disposed axially between the motor section and the pump section, and a fluid outlet section disposed at the top of the pump section; wherein
  the motor section comprises a synchronous motor, an outer casing enclosing the motor assembly, and a thermal transfer solution maintained within the outer casing and in fluidic contact with the synchronous motor, wherein the synchronous motor further comprises a rotor and a stator, the rotor comprising:
    a shaft which extends over the length of the motor section in rigid communication with and configured to rotate one or more pump impellers, said shaft comprising a concentric yoke integrally-formed with the shaft, the yoke comprising a fore end and an aft end;
    one or more permanent magnets disposed about the circumference of the yoke to form an interface with the yoke to comprise an outer dimension form closure on the circumference of the yoke such that form closed torque transmission is present between the one or more permanent magnets and the yoke, the one or more permanent magnets positioned to axially coincide with the yoke;
    a cladding tube disposed around the circumference of the permanent magnets, the cladding tube secures the one or more permanent magnets to the shaft through the yoke; and
    a stepped collar located on each of the fore end and the aft end of the yoke, wherein the one or more permanent magnets are sealed between the yoke and the cladding tube by the stepped collar; and
  the pump section disposed above the motor section comprises one or more pump bowls, the pump bowls comprising centrifugal impellers, wherein the centrifugal impellers are rotated by the turning of the shaft, the centrifugal impellers receive an extracted fluid through the fluid inlet and expel the extracted fluid through the fluid outlet.

12. The electric submersible pump of claim 11, wherein the motor section and the pump section may be comprised of serially-arranged modular subsections.

13. The electrical submersible pump of claim 12, wherein the serially-arranged modular subsections are pump bowls housing a centrifugal impeller.

14. The electric submersible pump of claim 11, wherein the shaft is fluidically isolated between the motor section and the pump section.

15. The electric submersible pump of claim 11, wherein the thermal transfer solution is in thermal communication with the extracted fluid, wherein the heat generated from the motor assembly is transferred from the motor assembly to the extracted fluid.

16. The electric submersible pump of claim 11, wherein the shaft extends over the length of the electric submersible pump.

17. The electric submersible pump of claim 11, wherein the thermal transfer solution is selected from the group consisting of water, antifreeze, or combinations thereof.

18. The electric submersible pump of claim 11, wherein the electric submersible pump is disposed within a well piping, the motor section further comprising a circumferential channel formed by the exterior of the outer casing and the interior of a well piping, and the circumferential channel provides a path for the extracted fluid around the outer casing and into the fluid inlet.

19. The electric submersible pump of claim 11, wherein the motor section and the pump section each further comprise seals disposed between the respective adjoining ends along the shaft.

* * * * *

UNITED STATES PATENT AND TRADEMARK OFFICE
CERTIFICATE OF CORRECTION

PATENT NO. : 10,767,652 B2
APPLICATION NO. : 16/060749
DATED : September 8, 2020
INVENTOR(S) : Michael Klahn Page 1 of 1

It is certified that error appears in the above-identified patent and that said Letters Patent is hereby corrected as shown below:

In the Claims

In Column 6, Line(s) 66, Claim 2, delete "wherein the wherein the" and insert --wherein the--, therefor.

Signed and Sealed this
Tenth Day of November, 2020

Andrei Iancu
*Director of the United States Patent and Trademark Office*